March 19, 1935. D. BELCHER ET AL 1,995,271
APPARATUS FOR COMPACTING MATERIAL IN CONTAINERS
Filed Dec. 22, 1932 6 Sheets-Sheet 4
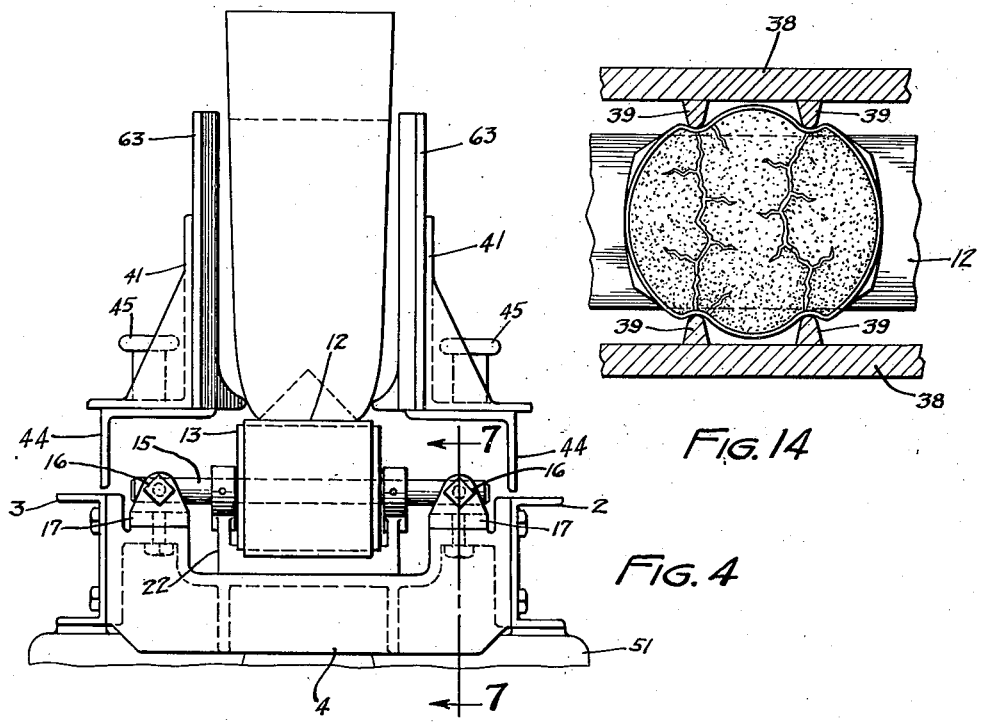
Fig. 14
Fig. 4
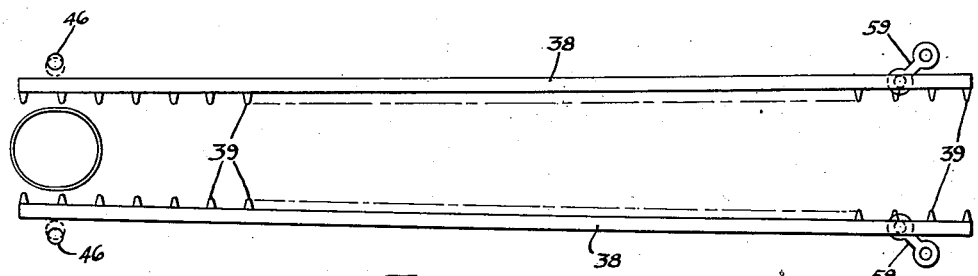
Fig. 12
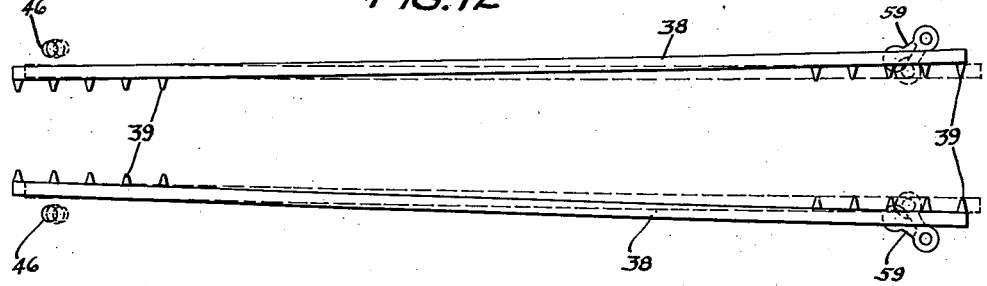
Fig. 13
Inventor
DANIEL BELCHER
BRADFORD R. STETSON
ATTORNEYS

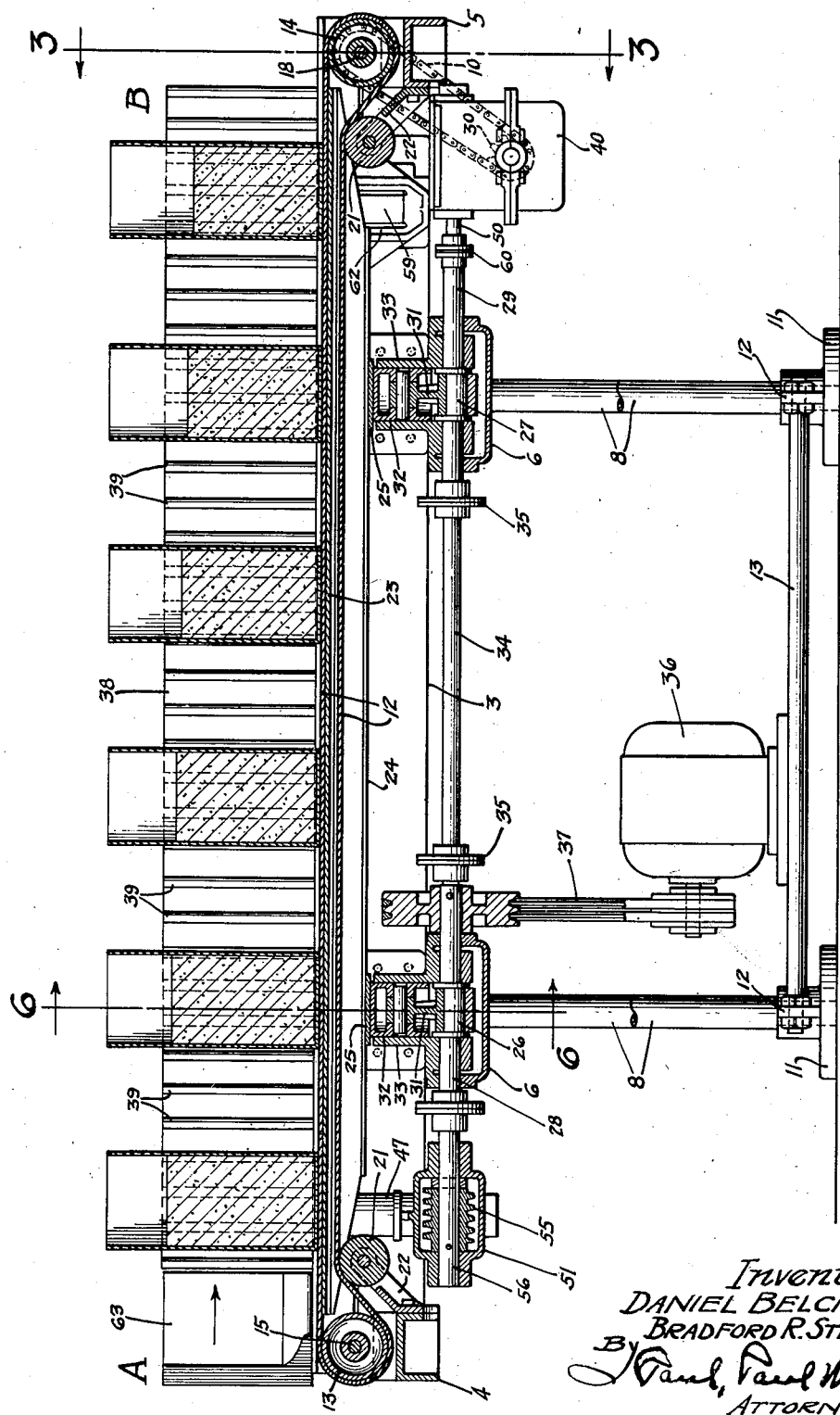

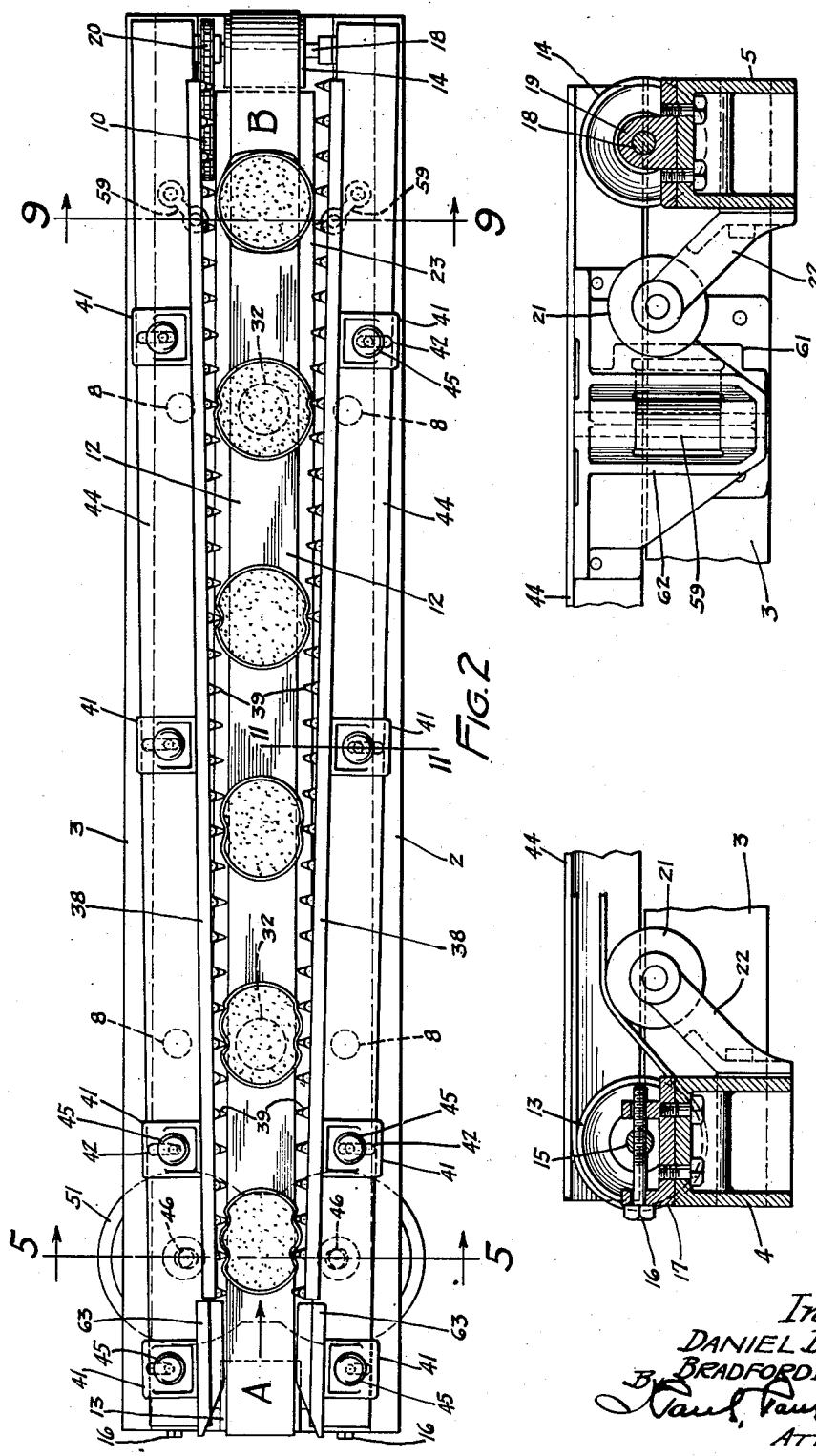

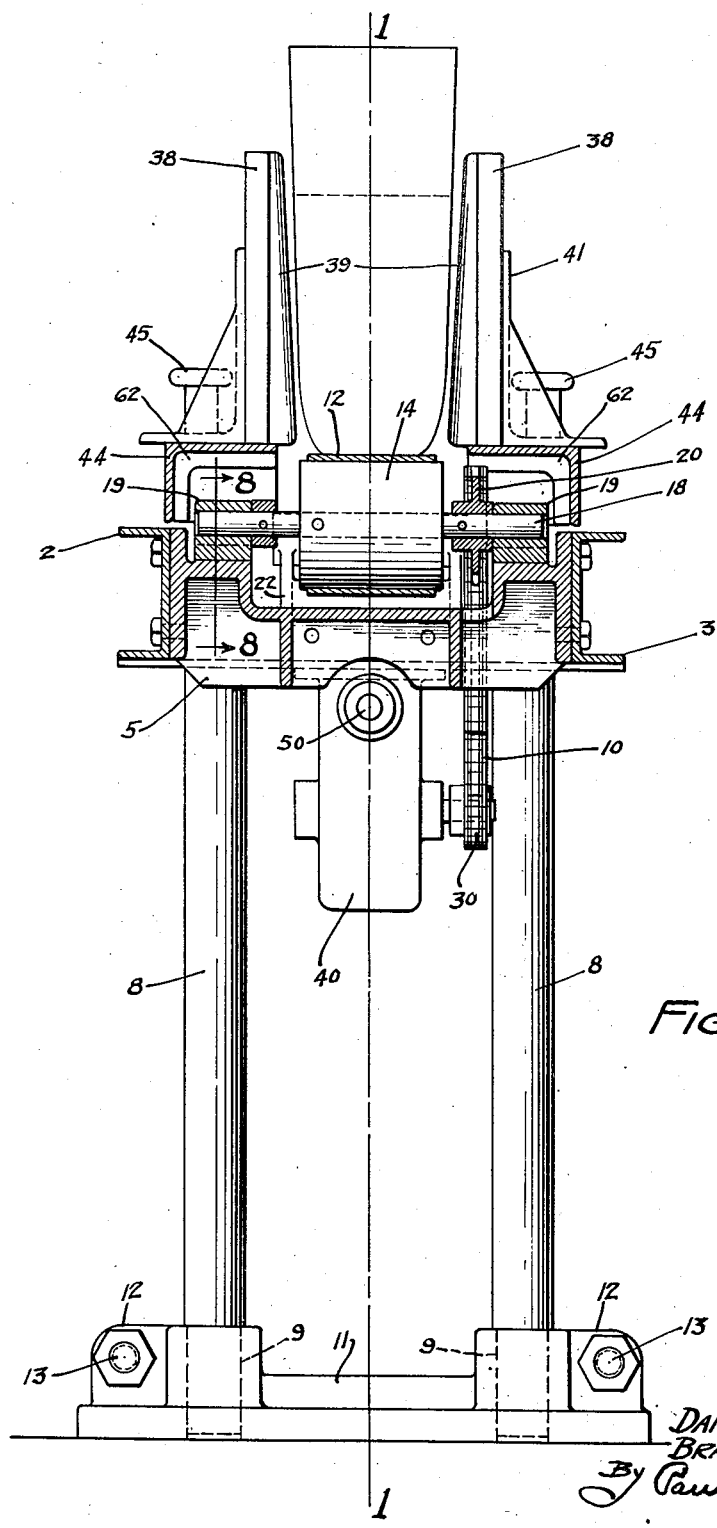

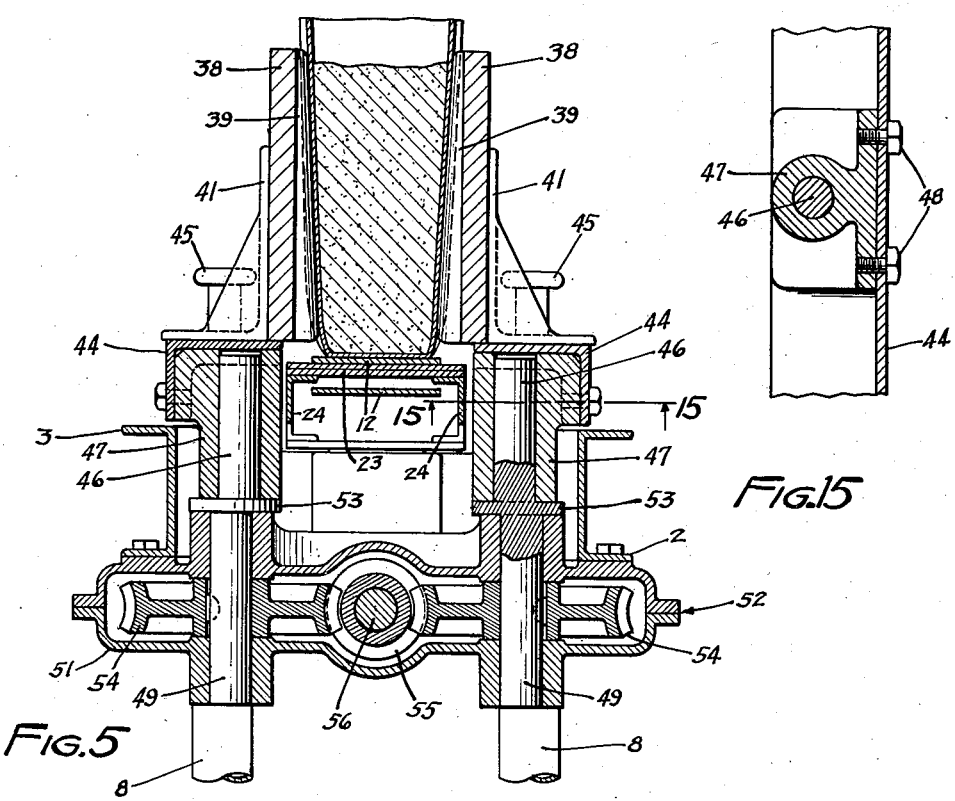
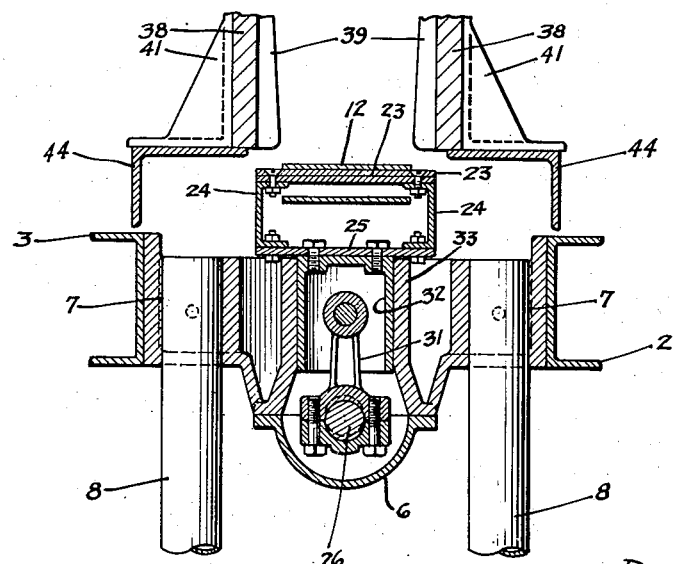

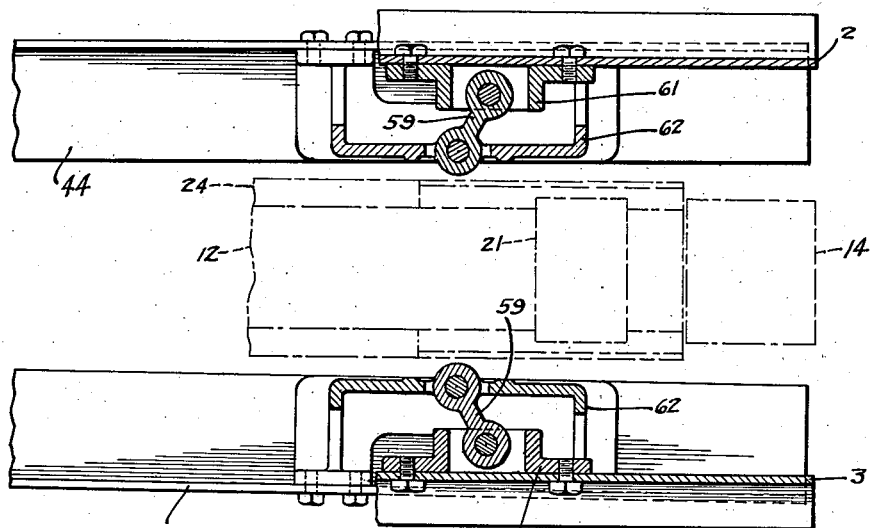
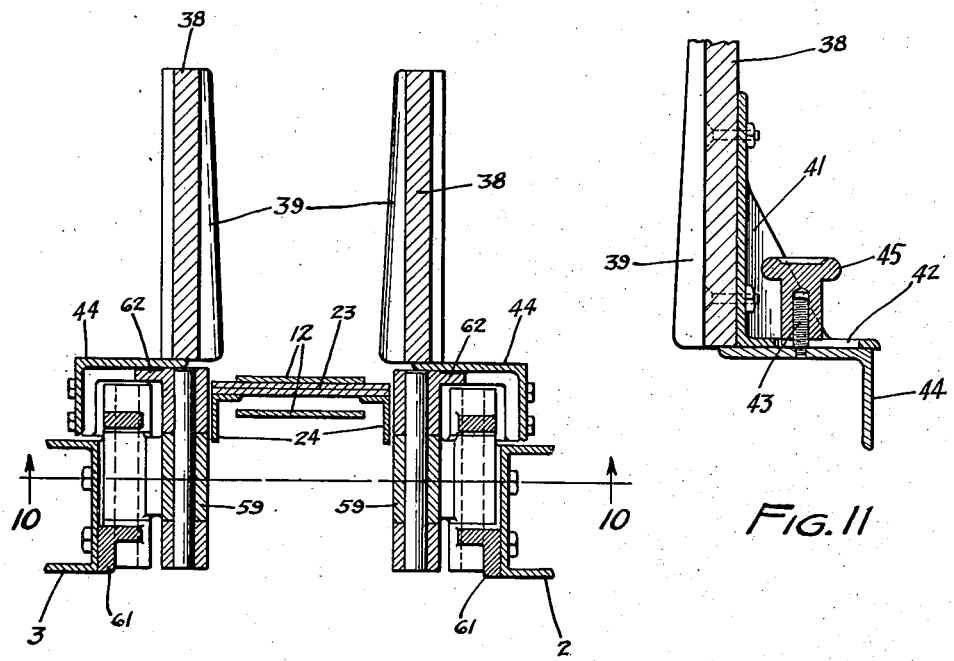

Patented Mar. 19, 1935

1,995,271

UNITED STATES PATENT OFFICE 1,995,271

APPARATUS FOR COMPACTING MATERIAL IN CONTAINERS

Daniel Belcher and Bradford R. Stetson, Minneapolis, Minn., assignors to Bemis Bro. Bag Co., Minneapolis, Minn., a corporation of Missouri Application December 22, 1932, Serial No. 648,430

13 Claims. (Cl. 259—72)

This invention relates to an improved method of and apparatus for compacting material in containers and bags prior to the sealing and closing of the open tops thereof.

More particularly, the invention relates to apparatus adapted for use in the milling industry to improve the packaging of flour, and other finely ground materials, which is packed in small paper bags or containers having flexible walls, and an object of the invention is to provide an improved machine having means for vibrating the filled bags, and means for operating upon the walls of the bag bodies to constantly displace and agitate the material therein simultaneously as the bags are being vibrated, whereby the interstitial characteristics of the material may be substantially removed therefrom and thereby permit the material to become firmly settled and compacted in the bags. When the material is thus firmly compacted in the bags before they are closed and sealed, further settling of the material after the bags have been sealed, is substantially eliminated, even though the bags may be roughly handled, and the bag bodies will thus maintain their original firm, shapely, and neat appearance.

Machines heretofore in general commercial use for settling and compacting material in bags or containers are of such nature that they impart only a vibratory or shaking motion to the bags to settle the material therein. We have found that to merely subject the bags to a vibratory or shaking motion, is not sufficient to completely settle and compact the material therein, particularly flour and, as a result, the material usually further settles after the bags have been closed and sealed. Such further settling of the material after the bags have been sealed, is undesirable, as it causes the walls of the bag bodies to become loose and more or less distorted, whereby the original neat and shapely appearance of the bag is lost.

When packaging such material as flour in small paper bags, it is highly desirable that the flour be firmly settled and compacted in the bags, before the latter are closed and sealed, so as to prevent the flour from further settling therein after the bags have been sealed, and this invention particularly concerns itself with the provision of a novel machine capable of so treating filled open bags or containers before the open tops thereof are closed and sealed, that when said bags are subsequently closed and sealed, the contents thereof will be so firmly compacted, that further settling of the material is substantially eliminated, resulting in the bags maintaining their original appearance until the sealed tops thereof are subsequently opened.

A further object of the invention is to provide a machine for settling material in bags, comprising means adapted to engage and indent the walls of the bag bodies in rapid succession, to displace and break up the material therein, whereby air entrained with the material during packing or bag filling operations is removed therefrom, and means for simultaneously imparting a vibratory motion to the bag bodies, to cause the material to settle into and fill the indentations and fissures being successively formed in the material by the action of said indenting means, whereby the material will become firmly settled and compacted in the bags.

The invention further pertains to a novel method of compacting finely ground material in paper bags or containers, which consists in operating upon the walls of the bag body to successively indent the same to thereby displace and agitate the material therein, and simultaneously vibrating the bag whereby the material will settle into the indentations and fissures which may be successively formed in the material, as a result of the work being performed upon the walls of the bag body, until the material becomes firmly settled and compacted in the bag.

A further object is to provide a machine for settling material in bags or containers having means whereby it may be adjusted to handle bags of different sizes.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a longitudinal sectional view on the line 1—1 of Figure 3, showing the means for imparting a vibratory motion to the bags and the means for conveying the bags through the machine;

Figure 2 is a plan view of Figure 1;

Figure 3 is a vertical sectional view on the line 3—3 of Figure 1;

Figure 4 is an end elevation of Figure 1 with some of the parts broken away;

Figure 5 is a cross-sectional view on the line

5—5 of Figure 2, showing the means for operating the bag body indenting means;

Figure 6 is a cross-sectional view on the line 6—6 of Figure 1, with some of the parts broken away;

Figure 7 is a detail sectional view on the line 7—7 of Figure 4, with some of the parts omitted;

Figure 8 is a detail sectional view on the line 8—8 of Figure 3, with some of the parts omitted;

Figure 9 is a detail sectional view on the line 9—9 of Figure 2;

Figure 10 is a detail sectional view on the line 10—10 of Figure 9, looking in the direction of the arrow;

Figure 11 is a detail sectional view on the line 11—11 of Figure 2;

Figure 12 is a diagrammatic view showing the indenting members in their outward or spread-apart positions;

Figure 13 is a similar view showing the receiving ends of said members in their intermediate positions;

Figure 14 is an enlarged detail sectional view showing how the material is displaced when the bag walls are indented; and Figure 15 is a detail sectional view on the line 15—15 of Figure 5.

Supporting frame

The novel machine herein disclosed is shown comprising suitable side rails 2 and 3 preferably of channel cross section, and having their ends connected together at each end of the machine by suitable cross members 4 and 5, which may be of cast metal, as shown in Figures 1 and 3. The intermediate portions of the side rails 2 and 3 are shown connected together by suitable castings 6 having sockets 7 therein adapted to receive suitable legs 8, the lower ends of which are received in sockets 9 provided in the base members 11. These base members are shown provided with ears 12 adapted to receive suitable tie rods 13 which secure together the lower portions of the legs 8.

Conveyer means

The conveyer is best shown in Figures 1, 2, 3, 4, and 7, and comprises an endless belt 12 supported at its ends upon suitable rollers 13 and 14, the former being rotatably mounted upon a shaft 15 adjustably mounted upon a pair of adjusting bolts 16, mounted for rotation in suitable guides provided in the brackets 17, which may be secured to the cross member 4 at the receiving end of the machine. The roller 14 at the discharge end of the machine is mounted upon a shaft 18 supported in bearings 19 secured to the cross member 5 of the main supporting frame. The lower run of the belt has running connections with a pair of idler pulleys 21, shown supported in suitable brackets 22 secured to the cross members 4 and 5 of the main supporting frame. The upper run of the belt 12 is supported upon a plate 23 secured to a pair of longitudinally extending rails 24 which may be of channel cross section, as best shown in Figure 6. The lower portions of the rails 24 are secured together by suitable members 25. The plate 23 extends from the roller 13 to the roller 14, as shown in Figure 4 and vertically supports substantially the full length of the upper run of the belt. The lower run of the belt travels between the side rails 24 of the supporting plate 23, as shown in Figures 1, 5, and 6.

The conveyer belt 12 may be driven by a suitable chain 10 mounted upon a sprocket 20 secured to the shaft 18 of the roller 14, and a pinion 30 mounted upon the shaft of a suitable speed reducer 40 having its shaft 50 connected to the shaft 29 by a flexible coupling 60.

Vibrating mechanism

To cause the material in the bags to become settled as the bags are advanced through the machine by the conveyer belt 12, a vibratory motion is imparted to the upper run of the belt upon which the bags are supported, whereby a similar motion will be imparted to the bags as they travel through the machine. The means for thus vibrating the bags is best shown in Figures 1 and 6, and comprises a pair of eccentrics 26 and 27 provided upon shafts 28 and 29, respectively, mounted in suitable bearings provided in the castings 6, as shown in Figure 1. Pitmans 31 operatively connect the eccentrics 26 and 27 to depending members 32 of the tie plates 25 of the rails 24 of the plate 23. The depending portions 32 are slidably supported in suitable guides 33 provided in the castings 6. By thus connecting the plate 23 with the eccentrics 26 and 27 of the shafts 28 and 29, when the latter are rotated, an up-and-down motion will be imparted to the plate 23 which will cause a similar motion to be imparted to the upper run of the belt 12, which normally is engaged therewith, so that as the bags are advanced along through the machine by the conveyer belt, a vibratory motion will be imparted thereto to cause the material therein to become settled. An intermediate shaft 34 is operatively connected to the shafts 28 and 29 by suitable couplings 35, whereby all of said shafts will rotate as a unit. The above mentioned shafts are driven from a suitable motor 36 having a belt drive 37 operatively connecting it with the shaft 28, as clearly shown in Figure 1.

Bag body indenting mechanism

To cause the material to become firmly compacted in the bags, means is provided for successively engaging and indenting the walls of the bag bodies to agitate or displace the material therein, simultaneously as the bags are being vibrated as they are advanced through the machine by the conveyer.

Such means is best shown in Figures 1, 2, 4, and 9 to 14, and comprises a pair of vertically disposed members 38 arranged adjacent to the conveyer belt 12 and having their inner faces provided with a plurality of vertically disposed inwardly directed cleats 39. These cleats are adapted to engage the walls of the bag body as the bag is advanced through the machine, as will subsequently be described.

Each member 38 is secured in position by a plurality of right angled brackets 41 having slots 42 in their horizontal portions adapted to receive threaded studs 43 secured to a pair of inwardly facing angle iron rails 44, as best shown in Figure 11. Suitable hand grips 45 are received in threaded engagement with the studs 43 and provide means for securing the members 38 in adjusted positions.

The members 38 are spaced apart as shown in Figures 2, 12, and 13, and their receiving ends are relatively closer together than the discharge ends thereof. A crank motion is imparted to the receiving ends of the members 38 by suitable cranks 46 received in bearings 47 secured to the angle iron rails 44 by suitable bolts 48. The cranks 46 are shown integrally formed with upright shafts 49 rotatably mounted in bearings provided in a gear housing 51, which preferably is split, as indicated at 52, for obvious reasons. Suitable thrust disks 53 are provided at the junctures of the cranks 46 and shafts 49, as shown in Figure 5, between the adjacent faces of the bearings 47 of the cranks 46, and the upper bearings of the shafts 49.

Worm gears 54 are suitably secured to the shafts 49 and mesh with a worm 55 secured to a shaft 56 shown mounted in suitable bearings provided in the gear housing 51, as shown in Figure 1. The shaft 56 is connected to the eccentric shaft 28 by a suitable coupling 57, whereby said shaft will rotate synchronously therewith.

The ends of the upright members 38 at the discharge end of the machine, are supported by pitmans 59, having their outer ends pivotally supported upon the side rail members 2 and 3 by suitable brackets 61, and having their inner ends pivotally connected to the angle iron rails 44 by suitable brackets 62, secured thereto. The pitmans 59 are preferably arranged as shown in Figures 2 and 10, so that when the side wall members 38 are actuated by the cranks 46, the discharge ends of the wall members 38 will be moved inwardly towards each other, as indicated by the dotted lines in Figure 13. The opposite ends of the members 38 will travel in a circular path disposed in a horizontal plane, as a result of being operatively connected to the cranks 46.

Suitable guides 63 may be provided at the receiving end of the machine for guiding the filled bags between the indenting members 38, as shown in Figure 2.

Operation

The novel apparatus herein disclosed may be interposed between a bag filling or packing machine, and a bag top closing and sealing machine so that the bags are delivered directly onto the conveyer belt 12 from the packer, or the bags may be delivered thereto from some other suitable source of supply. As the bags are delivered onto the conveyer belt 12, at the receiving end A of the machine, they are directed between the members 38 by the guides 63, whereupon the cleats 39 of the members 38 will engage the opposite sides of the bag body and vertically indent the walls thereof, as clearly illustrated in Figures 1, 5, and 14. The inwardly facing edges of the cleats 39 are preferably angularly disposed as shown in Figure 5, so that the cleats are of greater proportions at their lower ends than at their upper ends, whereby the indentations temporarily formed by the cleats 39 in the bag body may be relatively deeper at the lower portion of the bag body than at the upper portion thereof, as may be understood by reference to Figure 5.

Such indenting of the bag body will cause displacement of the material therein, as shown in Figure 14, and when the cleats 39 move out of engagement with the walls of the bag body, as shown in Figure 12, the material, because of the vibratory motion being imparted to the bag will settle into the indentations and fissures which may be formed in the material by the actions of the cleats 39, as shown in Figure 14. The members 38 operate continuously, so that as the bags are advanced through the machine by the conveyer belt 12, the cleats 39 engage the walls of the bag body at opposite sides thereof in rapid succession, thereby constantly displacing and agitating the material in the bags, simultaneously as the bags are being vibrated, whereby the interstices in the material will be substantially removed therefrom, and the material will be compacted firmly into the bag so that when the bag is subsequently discharged from the machine, the material will be thoroughly settled and compacted therein.

Because of the cleat supporting members 38 being arranged at a slight angle with relation to each other, as shown in Figures 2, 12, and 13, the pressure of the cleats against the bag body, as the latter travels through the machine, will be constantly diminishing, until the bag reaches the position B in Figure 2, in which position the cleats have very little effect upon the bag body.

While the cleats engage the walls of the bag body with considerable pressure when the bags are delivered thereto from the guides 63, they do not shape the bag bodies, but merely work upon them in such a manner that the material is constantly being displaced and agitated therein to cause entrained air to be removed therefrom, and whereby the comminuted particles of the material will become firmly packed in the bag, so that when the bag reaches the position B in Figure 2, the material will be so firmly packed that further displacement or agitation of the material in the bag will be of little value. It will thus be noted that when the bags are first delivered between the members 38, there is a rather violent displacement and agitation of the material in the bag, which constantly diminishes as the bags travel through the machine until it reaches the position B at the discharge end thereof. By thus diminishing the pressure of the cleats against the bag body, the bag body assumes its natural rounded or cylindrical shape cross-sectionally, so that when discharged from the machine, the bag body will be substantially cylindrical in form, which is the natural shape assumed by the bag as a result of firmly compacting the material therein.

The machine herein disclosed is particularly useful in the packaging of flour as we have found that by passing the bags through the machine, as hereinbefore described, the material will become so firmly compacted or settled therein, that after the bags are closed and sealed, they may readily be handled in transit without causing the material to become further settled. The bags will thus maintain their original firmness and neat appearance until they are subsequently opened for the removal of material therefrom.

Figure 14 diagrammatically illustrates the action of the flour in a bag when the walls of the bag are engaged and indented by the cleats 39. When the cleats engage the walls of the bag and press portions thereof inwardly, fissures may form in the flour in the bag, as indicated in Figure 14, because of the bag walls being indented or pressed inwardly by the action of the cleats 39, which, of course, results in displacement of the material in the bag. As soon as the cleats move out of engagement with the walls of the bag body, portions of the material promptly settle into these fissures, because of the constant vibration being imparted to the bag body, and simultaneously the indented portions of the walls of the bag body immediately tend to assume their normal expanded positions, because of the settling of the material in the bag. By thus constantly indenting opposite sides of the bag body and vibrating it as it passes through the machine, practically all air entrained with the material will be expelled therefrom, and the material will become so firmly compacted in the bag, that when the bag subsequently reaches the discharge end of the machine, further settling of the material in the bag is substantially eliminated.

The machine is of very simple and inexpensive construction and requires few operating parts. It is self-contained and may readily be moved about from place to place. The operating parts thereof, including the conveyer belt, vibrating mechanism, and bag body indenting mechanism, are all interconnected, and are operated simultaneously by the single motor 36.

We claim as our invention:

1. In a machine for settling and compacting flour in paper bags, a conveyer for the bags, vertically disposed indenting members at each side of said conveyer, means for actuating said members to cause them to simultaneously engage and indent opposite walls of the bag bodies while the bags are being advanced by said conveyer, to thereby displace and agitate the material in the bags, means for simultaneously vibrating the bags to cause the material to become firmly settled and compacted therein, and each set of indenting members being arranged at an incline to the longitudinal axis of the conveyer whereby the pressure of said indenting members upon the bag bodies will gradually diminish, as the bags travel through the machine, to thereby permit the bag bodies to assume their natural shape.

2. In a machine for settling and compacting material in bags, a conveyer for the bags, means for imparting a vibratory motion to the bags conveyed thereby, means adjacent to said conveyer for displacing and agitating the material in the bags whereby it may become settled, said means comprising cooperating members mounted for movement in a horizontal plane and adapted to engage and indent opposite walls of the bag bodies in rapid succession, simultaneously as the bags are advanced through the machine by the conveyer, said members being angularly disposed to the longitudinal axis of the conveyer, whereby said members will engage the bag bodies with diminishing pressure, as the bags travel through the machine, and thereby permit the bag bodies to assume their natural rounded shape.

3. In a machine for settling and compacting material in bags, a conveyer for the bags, and cooperating members having vertically disposed cleats thereon adapted to engage and indent opposite walls of the bag bodies to thereby displace and agitate the material therein, and means for simultaneously vibrating the bags, whereby the material will become settled and compacted therein.

4. In a machine for settling and compacting flour in paper bags, a conveyer for the bags, cooperating members mounted adjacent to said conveyer and having cleats thereon, means for imparting circular motions to the receiving ends of said members in opposite directions, whereby the cleats thereof are moved into and out of engagement with the walls of the bag bodies to successively indent the same and thereby displace and agitate the material therein, and means for simultaneously vibrating the bags whereby the material will become settled and compacted therein.

5. In a machine for settling and compacting flour in paper bags, a conveyer for the bags, cooperating members mounted adjacent to said conveyer and having vertically disposed cleats on the inwardly facing sides thereof, means for imparting circular motions to the receiving ends of said members in opposite directions, means for guiding the opposite ends of said members in arcuate paths, means for driving said members whereby the cleats thereof will engage and indent opposite walls of the bag bodies in rapid succession to displace and agitate the material therein, and means for simultaneously vibrating the bags, as they are advanced between said members by said conveyer, whereby the material will become settled and compacted therein.

6. In a machine for settling and compacting material in bags, a conveyer for the bags comprising an endless belt, a support for the upper run of the belt, means for vibrating said support to impart a vibratory motion to the bags as they are advanced thereover by the conveyer, members mounted at opposite sides of the conveyer and each comprising a plurality of vertically disposed cleats, and means for actuating said members to cause them to simultaneously move towards and away from the bags whereby said cleats engage and indent opposite walls of the bag bodies, simultaneously as they are advanced by the conveyer, whereby the material in said bag will become firmly settled and compacted therein.

7. In a machine for compacting flour in paper bags, a conveyer for the bags, bag wall indenting members adjacent to said conveyer, means for imparting circular motions to the receiving ends of said members, whereby they are moved into and out of engagement with the walls of the bag bodies, means for guiding the opposite ends of said indenting members in arcuate paths, and means for simultaneously vibrating the bags as they are advanced between said members, whereby the material will become settled and compacted therein.

8. In a machine for compacting flour in paper bags, a conveyer for the bags, bag wall indenting members adjacent to said conveyer, means for imparting circular motions to the receiving ends of said members, whereby they are moved into and out of engagement with the walls of the bag bodies, means for simultaneously vibrating the bags as they are advanced between said members, to thereby cause the material to become settled and compacted therein, and each of said indenting members being arranged at an incline to the longitudinal axis of the conveyer, whereby the pressure exerted thereby against the bag bodies will gradually diminish as the bags are advanced.

9. In an apparatus for settling finely ground material in containers having flexible walls, means for advancing the containers, means for vibrating the containers as they are advanced, and means for simultaneously indenting opposite walls of the container bodies with diminishing pressure to thereby agitate the material therein and cause it to settle, said indenting means engaging the container bodies with greater pressure at the lower portions than at their upper portions.

10. In an apparatus for settling finely ground material in flexible containers, means for advancing the containers along a predetermined path, means for vibrating the containers, means for indenting opposite walls of the container bodies, while in motion, to thereby displace and agitate the material therein and cause it to firmly settle in the containers, and inwardly projecting means on said elements adapted to engage the lower portions of the container bodies with relatively greater pressure.

11. In a machine for settling and compacting comminuted material in a flexible wall container, means for supporting the container as it passes through the machine, and means for indenting the walls of the container a plurality of times during such passage, said indenting means effecting a deeper indentation at the bottom portion of the container than at the top portion thereof, thereby tending to form fissures in the material to permit the entrained air to escape and allow the material to settle in the container.

12. In a machine for settling and compacting comminuted material in a flexible wall container, means for supporting and vibrating the container as it passes through the machine, and means for simultaneously indenting the walls of the container along relatively narrow elongated areas thereof, thereby tending to form fissures in the material to permit entrained air to escape and allow the material to settle in a compact mass.

13. In a machine for settling and compacting comminuted material in a flexible wall container, means for supporting the container as it passes through the machine, and means for indenting the walls of the container a plurality of times during such passage thereby tending to form fissures in the material to permit entrained air to escape and allow the material to settle in the container, said indenting means being arranged at a diverging angle with respect to the longitudinal axis of the supporting means for the container, whereby the pressure exerted thereby against the flexible wall container will gradually diminish as the container is advanced.

DANIEL BELCHER.
BRADFORD R. STETSON.